United States Patent [19]

Mueller et al.

[11] Patent Number: 5,409,682
[45] Date of Patent: Apr. 25, 1995

[54] PREPARATION OF ESSENTIALLY ALKALI-FREE BOROSILICATE CRYSTALS HAVING A ZEOLITE STRUCTURE

[75] Inventors: Ulrich Mueller, Neustadt; Wolfgang Hoelderich, Frankenthal, both of Germany

[73] Assignee: BASF Aktiengesellschaft, Ludwigshafen, Germany

[21] Appl. No.: 172,871

[22] Filed: Dec. 23, 1993

Related U.S. Application Data

[63] Continuation of Ser. No. 938,879, Aug. 31, 1992, abandoned.

[30] Foreign Application Priority Data

Sep. 21, 1991 [DE] Germany ............. 41 31 448.4

[51] Int. Cl.⁶ ..................................... C01B 33/20
[52] U.S. Cl. ........................... 423/277; 423/325; 423/704; 502/64; 502/202
[58] Field of Search ................ 423/277, 704; 502/64, 502/282

[56] References Cited

U.S. PATENT DOCUMENTS

| | | | |
|---|---|---|---|
| 4,269,813 | 5/1981 | Klotz | 423/326 |
| 4,285,919 | 8/1981 | Klotz et al. | 423/277 |
| 4,331,641 | 5/1982 | Hinnenkamp et al. | 423/701 |
| 4,401,637 | 8/1983 | Marosi et al. | 423/705 |
| 4,456,582 | 6/1984 | Marosi et al. | 423/708 |
| 4,462,971 | 7/1984 | Hinnenkamp et al. | 423/326 |
| 4,514,516 | 4/1985 | Puskas | 502/202 |
| 4,554,142 | 11/1985 | Hoelderich et al. | 423/701 |
| 4,656,016 | 4/1987 | Taramasso et al. | 423/705 |
| 4,721,607 | 1/1988 | Haddad et al. | 423/703 |
| 5,110,570 | 5/1992 | Bellussi et al. | 423/705 |
| 5,296,208 | 3/1994 | Lesch | 423/704 |

FOREIGN PATENT DOCUMENTS

| | | |
|---|---|---|
| 1142905 | 3/1983 | Canada . |
| 0007081 | 1/1980 | European Pat. Off. . |
| 0068796 | 1/1983 | European Pat. Off. . |
| 0077946 | 5/1983 | European Pat. Off. . |
| 0184927 | 6/1986 | European Pat. Off. . |
| 0293032 | 11/1988 | European Pat. Off. . |
| 0224531 | 12/1988 | European Pat. Off. . |
| 2830787 | 1/1980 | Germany . |
| 2909929 | 9/1980 | Germany . |
| 2024790 | 1/1980 | United Kingdom . |
| 1557101 | 4/1990 | U.S.S.R. . |

OTHER PUBLICATIONS

J. C. Jansen, E. Biron and H. van Bekkum, Innovation in Zeolite Materials (1988) pp. 133–141.
Database WPIL, Week 9110, Derwent Publ. Ltd., London, GB; AN 91-071605, 1991.

*Primary Examiner*—Anthony McFarlane
*Attorney, Agent, or Firm*—John H. Shurtleff

[57] ABSTRACT

Essentially alkali-free borosilicate crystals having a zeolite structure and a size of from 2 to 150 μm, measured over the longitudinal crystallite axis, are prepared by a process in which an $SiO_2$-containing mixture of water, a tetraalkylammonium compound, a boron component and ammonia is reacted hydrothermally in the absence of a metal hydroxide or of a metal salt in a molar ratio of ammonia/tetraalkylammonium of from 3:1 to 150:1.

9 Claims, 6 Drawing Sheets

10 μm

10 μm

10 μm

10 μm

PREPARATION OF ESSENTIALLY ALKALI-FREE BOROSILICATE CRYSTALS HAVING A ZEOLITE STRUCTURE

This application is a continuation of application Ser. No. 07/938,879, filed Aug. 31, 1992, now abandoned.

The present invention relates to a novel and improved process for the preparation of essentially alkali-free borosilicate crystals having a zeolite structure in the absence of a metal hydroxide or of a metal salt under hydrothermal conditions.

In the preparation of crystalline borosilicates, it is known that, for example, aqueous alkaline mixtures of a silica source, a boron oxide source, sodium oxide and an organic template compound, for example a tetra-n-propylammonium salt, are reacted hydrothermally under autogenous pressure. Such processes are described in, for example, EP-A-68 796. The use of piperidine or hexamethyleneimine as an organic template compound is described in EP-A-293 032, and DE-A-28 30 787 and EP-A7081 show that borosilicate zeolites are likewise obtained in an alkali-free synthesis mixture with hexamethylenediamine. The use of hexamethylenediamine and borosilicate glass as starting components is disclosed in DE-A-29 09 929. The use of ethylenediamine and sodium hydroxide for the synthesis is described in GB-A2,024,790. The synthesis of borosilicate zeolites (ZBH) in an ether or aqueous ether medium in the presence of alkali metal salts is disclosed in EP-A-77 946. Crystallization from fluoride-containing synthesis mixtures is disclosed in EP-A-224 531.

With regard to the preparation of borosilicate zeolites having large crystal sizes, J. C. Jansen, E. Biron and H. van Bekkum (Innovation in Zeolite Materials Science, Grobet, Mortier, Vansant and Schulz-Ekloff (Eds.), Elsevier (Amsterdam) 1988, pages 133–141) describe a method which starts from an alkali-containing system and, with a tetrapropylammonium/$SiO_2$ ratio of from 3.3:1 to 10:1, requires high concentrations of tetrapropylammonium.

In the samples prepared in this manner from alkali-containing synthesis processes, the borosilicate zeolites prepared must be freed from the amine-containing template compounds by a heat treatment. The catalytically active H form must then be prepared therefrom, for example by ion exchange and a second heat treatment. However, this method is very labor-intensive.

In the alkali-free preparation process according to EP-A-7 081, the ion exchange for conversion into the H form can be dispensed with, but preparation of borosilicate zeolites having a crystal size substantially greater than 2 $\mu$m is then impossible, as is also the case with U.S. Pat. No. 4,285,919. For use in catalytic processes, finely divided zeolite powder must then be processed in a labor-intensive shaping step to give catalyst extrudates which are suitable for use in a catalytic process.

It is an object of the present invention to remedy the abovementioned disadvantages.

We have found that this object is achieved by a novel and improved process for the preparation of essentially alkali-free borosilicate crystals having a zeolite structure and a size of from 2 to 150 $\mu$m, measured over the longitudinal crystallite axis, wherein an $SiO_2$-containing mixture of water, a tetraalkylammonium compound, a boron component and ammonia is reacted hydrothermally in the absence of a metal hydroxide or of a metal salt in a molar ratio of ammonia/tetraalkylammonium of from 3:1 to 150:1.

By using, for example, a template mixture composed of tetrapropylammonium salts and tetrapropylammonium hydroxide, the novel process makes it possible to influence the size of the resulting crystals and their size distribution in a simple manner through the composition of the reaction mixture and requires only small amounts of tetraalkylammonium, corresponding to a tetraalkylammonium/$SiO_2$ ratio of from 0.042:1 to 0.2:1, preferably from 0.05:1 to 0.15:1.

In particular, it is possible to obtain the predominant part of the resulting borosilicate zeolites in the form of particles which are of uniform size and are obtained without agglomeration, if the reaction is carried out using a reaction mixture with molar ratios of $SiO_2/B_2O_3$ of from 10:1 to 1500:1, preferably from 10:1 to 250:1, particularly preferably from 10:1 to 100:1, and/or a dilution of $SiO_2$ with $H_2O$ of from 0.07:1 to 0.025:1, preferably from 0.05:1 to 0.04:1, is maintained.

The silica is preferably used in the process as an aqueous colloidal solution which can be obtained in known manner from pyrogenic silica, a hydrolyzable tetraalkoxysilane or prepared silica moldings.

The novel alkali-free process furthermore ensures that, after a heat treatment of from 350 to 600° C., preferably from 400 to 550° C., particularly preferably from 450 to 500° C. the material is present in an active H form and can be used as a catalyst directly and without additional ion exchange and in particular because of the crystal size of more than 2 $\mu$m, ie. from 2 to 150 $\mu$m, preferably from 3 to 120 $\mu$m, particularly preferably from 5 to 80 $\mu$m, without further shaping.

The borosilicate zeolite prepared by the process described can be used for the catalytic conversion of organic molecules, for example for catalytic alkylation, isomerization, rearrangement reactions, disproportionation reactions, acylation, cyclization, hydration and dehydration, amination, hydrogenation and dehydrogenation, dehydrocyclization, hydroxylation and epoxidation, and for combinations of these reactions. The borosilicate zeolites prepared according to the invention can furthermore catalyze the conversion of methanol to a mixture of $C_2$-$C_4$-olefins. Reactions of this type are described in, for example, W. Hölderich et al., Alumino-silicate and Borosilicate Zeolites and their use in the conversion of methanol to olefins, in D. Olson and A. Bisio (eds.), Proceedings of 6th YZC, Reno, Nev. USA, 1983, Butterworths, 1984, pages 545–555, or in W. Hölderich, Zeolites: Catalysts for the synthesis of organic compounds, Elsevier, Studies Surf. Sci. Catal., Vol. 49, Amsterdam (1989), pages 69 to 93.

The particular pore structure of the material and the simple preparation enable the borosilicate zeolites prepared according to the invention to be used as microporous adsorbents, for example for separating organic molecules or their isomers in liquid or gaseous phase.

The Examples which follow illustrate the preparation process according to the invention.

EXAMPLE 1

This Example illustrates the synthesis of crystals of uniform size over a long crystallization time.

2.22 kg of tetrapropylammonium bromide, 7.96 kg of silica sol LUDOX ® AS-40 (Du Pont), 8.9 kg of demineralised water and 386 g of trimethyl borate were initially taken in a steel autoclave having a stirring apparatus. 7.2 kg of an aqueous 25% strength by weight ammonia solution were added to this suspension. The resulting suspension was heated to 185° C. in the closed autoclave with stirring (100 rpm) and was caused to crystallize in the course of 168 hours. After cooling, the solid was filtered off, washed neutral, dried at 120° C. and finally subjected to a heat treatment at 500° C.

The yield of borosilicate zeolite was 97%, based on $SiO_2$ used. The chemical analysis of the product gave a composition of 96.5% by weight of $SiO_2$, 1.48% by weight of $B_2O_3$ and traces of 140 ppm of sodium and 90 ppm of $Al_2O_3$. The product was completely crystalline and gave the powder diffraction pattern shown in FIG. 1.

The crystals had an average size of 12 μm. The narrow size distribution is shown in FIG. 2.

EXAMPLE 2

This Example illustrates the synthesis of crystals of uniform size over a long crystallization time in a static experiment.

6.9 g of tetrapropylammonium bromide, 75.3 g of silica sol LUDOX AS-408R8 (Du Pont), 83.1 g of demineralised water and 3.66 g of trimethyl borate were initially taken in a teflon-lined steel autoclave. 68.8 g of an aqueous 25% strength by weight ammonia solution were added to this suspension.

The resulting suspension was homogenized, heated to 185° C. in the closed autoclave and caused to crystallize in the course of 168 hours. After cooling, the solid was filtered off, washed neutral, dried at 120° C. and finally subjected to a heat treatment at 500° C.

The yield of borosilicate zeolite was 98%, based on SiO2 used.

The chemical analysis of the product gave a composition of 97.6% by weight of $SiO_2$, 1.7% by weight of $B_2O_3$ and traces of 120 ppm of sodium. The product was completely crystalline and gave the powder diffraction pattern shown in FIG. 3.

The crystals had an average size of 50 μm. The narrow size distribution can be assessed with reference to FIG. 4.

EXAMPLE 3

This Example illustrates the synthesis of borosilicate zeolite using a mixture of tetrapropylammonium hydroxide and tetrapropylammonium bromide having a synthesis time which is furthermore shorter.

34.7 g of tetrapropylammonium bromide, 468 g of silica sol LUDOX ® AS-40 (Du Pont), 524 g of demineralised water and 22.8 g of trimethyl borate were initially taken in a steel autoclave having a stirring apparatus. 423 g of an aqueous 25% strength by weight ammonia solution and 38.8 g of an aqueous 20% strength by weight tetrapropylammonium hydroxide solution were added to this suspension.

The resulting suspension was heated to 185° C. in the closed autoclave with stirring (1006 rpm) and was caused to crystallize in the course of 46 hours. After cooling, the solid was filtered off, washed neutral, dried at 120° C. and finally subjected to a heat treatment at 500° C.

The yield of borosilicate zeolite was 96%, based on $SiO_2$ used. The chemical analysis of the product gave a composition of 97.1% by weight of $SiO_2$, 1.69% by weight of $B_2O_3$ and traces of 130 ppm of sodium and 1200 ppm of $Al_2O_3$. The product was completely crystalline and gave the powder diffraction pattern shown in FIG. 5.

The crystals had a size distribution of from 5 to 22 μm. The size distribution can be assessed with reference to FIG. 6.

EXAMPLE 4

This Example illustrates the synthesis of borosilicate zeolite using a mixture of tetrapropylammonium hydroxide and tetrapropylammonium bromide in a short synthesis time and with a larger amount of tetrapropylammonium hydroxide compared with Example 3.

47.2 g of tetrapropylammonium bromide, 468 g of silica sol LUDOX ® AS-40 (Du Pont), 446 g of demineralised water and 22.7 g of trimethyl borate were initially taken in a steel autoclave having a stirring apparatus. 423 g of an aqueous 25% strength by weight ammonia solution and 97.3 g of an aqueous 20% strength by weight tetrapropylammonium hydroxide solution were added to this suspension.

The resulting suspension was heated to 185° C. in the closed autoclave with stirring (1006 rpm) and was caused to crystallize in the course of 17 hours. After cooling, the solid was filtered off, washed neutral, dried at 120° C. and finally subjected to a heat treatment at 500°0 C.

The yield of borosilicate zeolite was 90%, based on $SiO_2$ used.

The chemical analysis of the product gave a composition of 94.7% by weight of $SiO_2$, 1.22% by weight of $B_2O_3$ and traces of 200 ppm of sodium and 1200 ppm of $Al_2O_3$. The product was completely crystalline and gave the powder diffraction pattern shown in FIG. 7.

The crystals had a size distribution of from 2 to 11 μm. The size distribution can be assessed with reference to FIG. 8.

Figure 1:
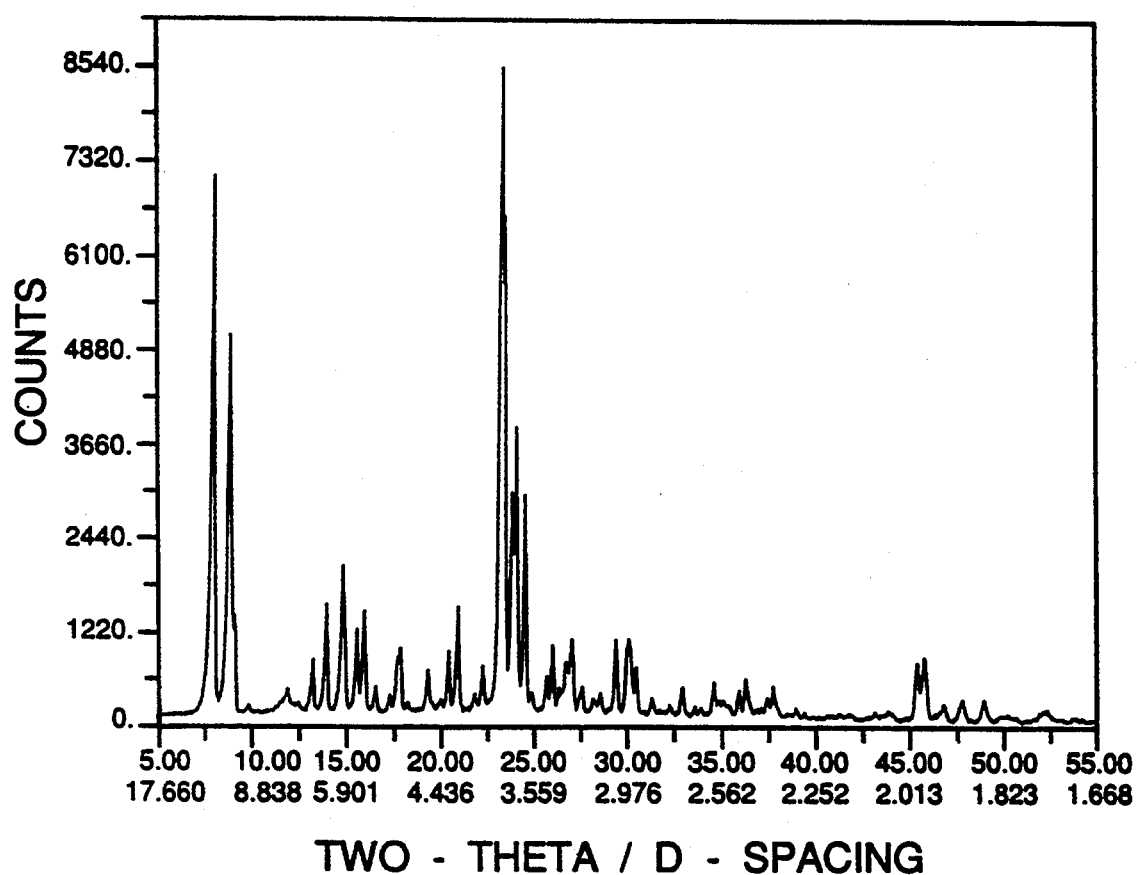
FIG. 1: X-ray powder diffraction pattern of the sample from Example 1 (Cu-Kα radiation; Siemens D500)
Figure 2:
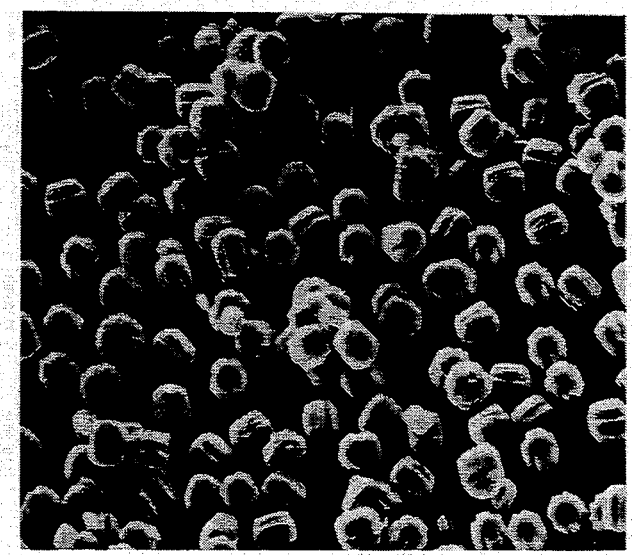
FIG. 2: Scanning electron micrograph of the product from Example 1
Figure 4:
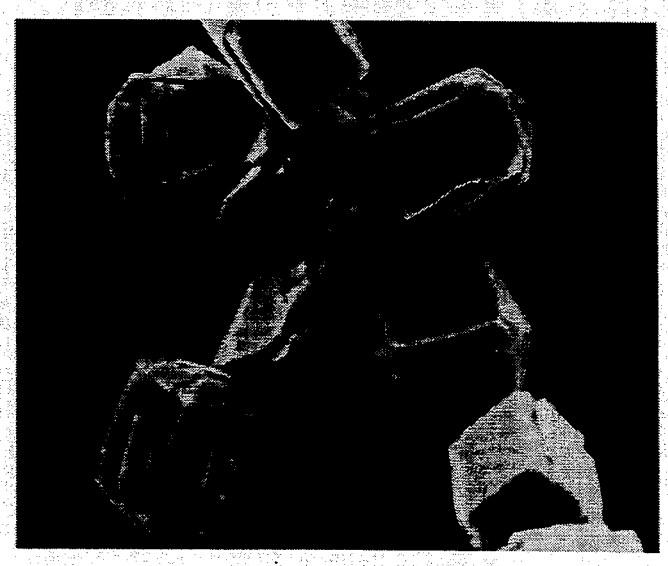
FIG. 4: Scanning electron micrograph of the product from Example 2
Figure 3:
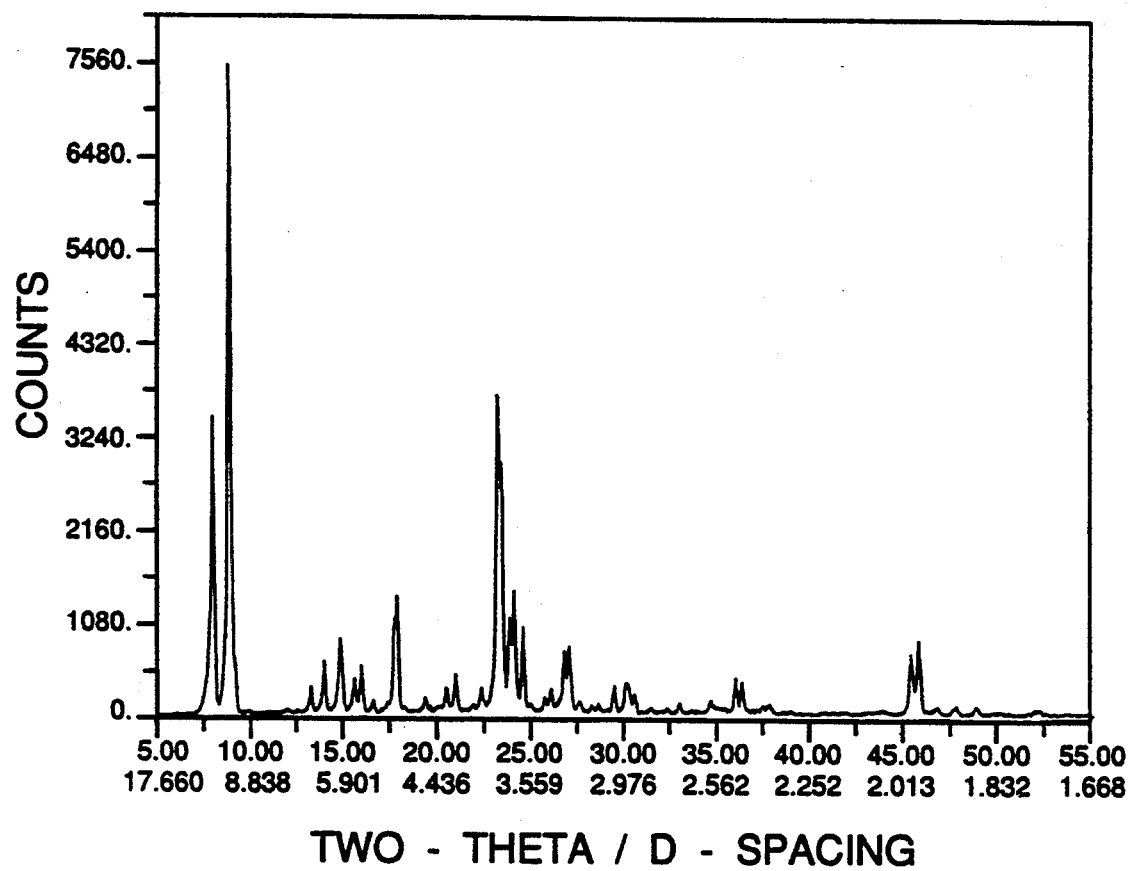
FIG. 3: X-ray powder diffraction pattern of the sample from Example 2 (Cu-Kα radiation; Siemens D500)
Figure 5:
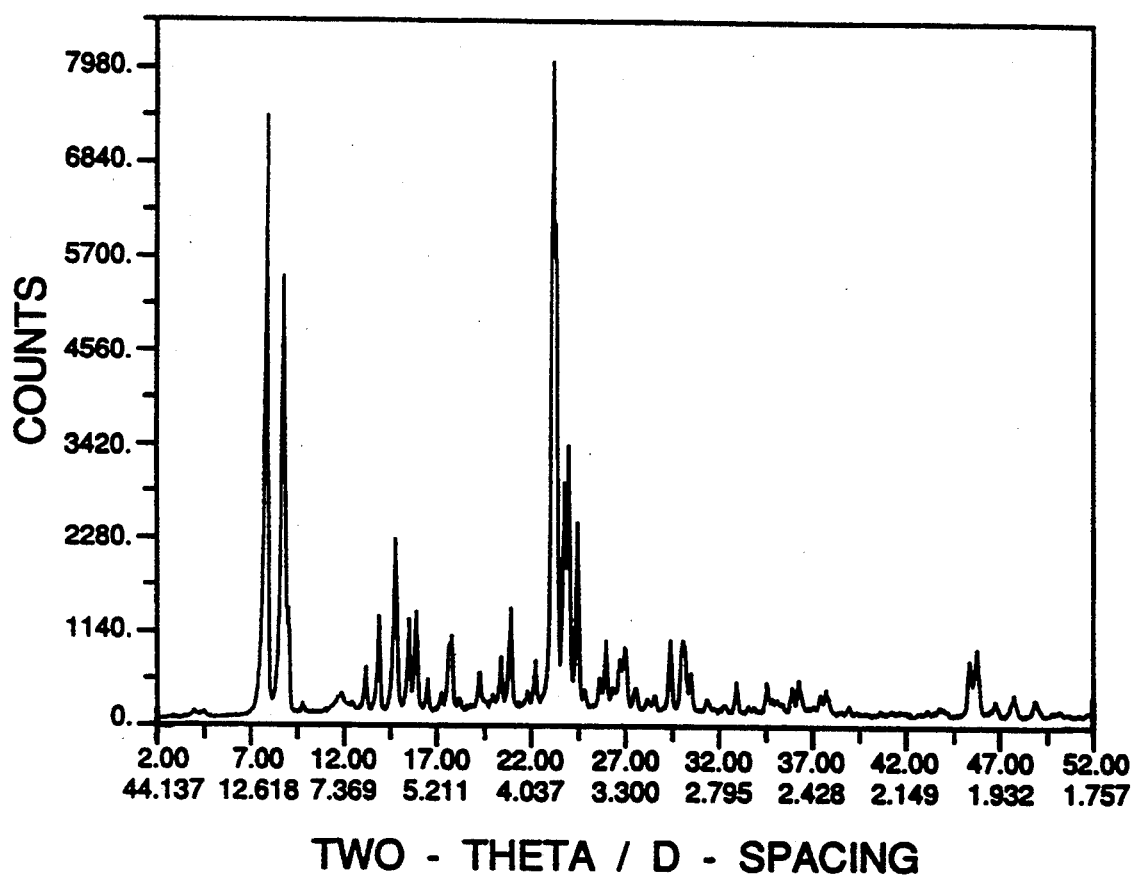
FIG. 5: X-ray powder diffraction pattern of the sample from Example 3 (Cu-Kα radiation; Siemens D500)
Figure 6:
FIG. 6: Scanning electron micrograph of the product from Example 3
Figure 8:
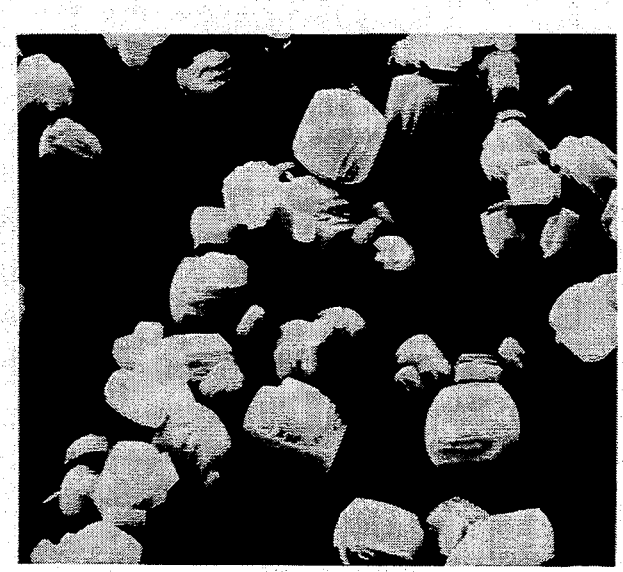
FIG. 8: Scanning electron micrograph of the product from Example 4
Figure 7:
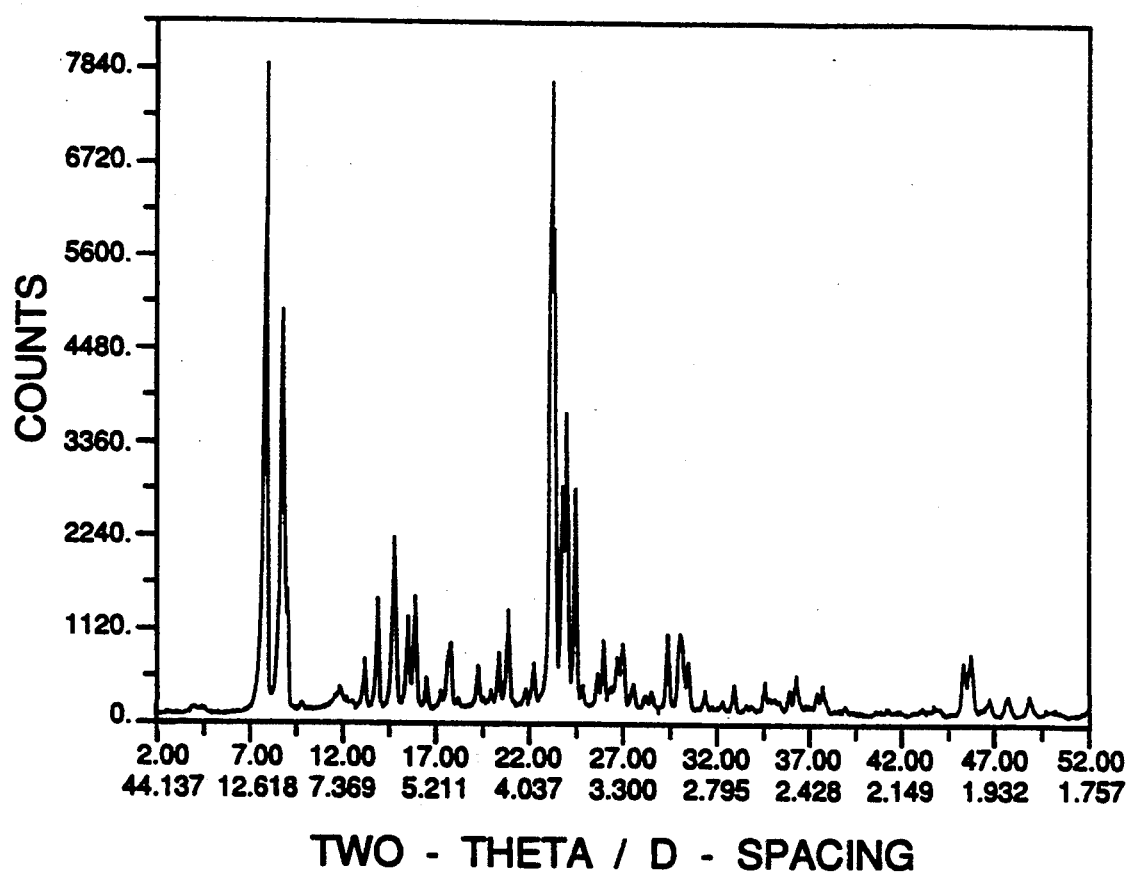
FIG. 7: Values of the X-ray powder diffraction pattern of the sample from Example 1 (Cu-Kα radiation; Siemens D500)

We claim:

1. A process for the preparation of essentially alkali-free borosilicate crystals having a zeolite structure and an average particle size of from 2 to 150 μm, measured over the longitudinal crystallite axis which comprises:
hydrothermally reacting a reaction mixture consisting of $SiO_2$, water, a tetraalkylammonium compound selected from the group consisting of tetraalkylammonium bromide, tetraalkylammonium hydroxide and mixtures thereof, a boron component and ammonia in the absence of any metal hydroxide or metal salt, using a molar ratio of ammonia/tetraalkylammonium of 3:1 to 150:1, a molar ratio of tetraalkylammonium/$SiO_2$ of from 0.042:1 to 0.2:1 and a molar ratio of $SiO_2/H_2O$ of from 0.07:1 to 0.025:1.

2. A process as claimed in claim 1, wherein the hydrothermal crystallization is carried out under autogenous pressure at from 100° to 250° C.

3. A process as claimed in claim 1, wherein the $SiO_2$ is used as an aqueous colloidal solution having a ratio of $SiO_2/H_2O$ of from 0.05:1 to 0.04:1.

4. A process as claimed in claim 1, wherein boric acid, boron oxide or trimethyl borate is used as the boron component, in a ratio of $SiO_2/B_2O_3$ of from 10:1 to 1500:1.

5. A process as claimed in claim 1, wherein dissolved tetra-n-propylammonium salt, dissolved tetra-n-propylammonium hydroxide or a mixture of the two components is used as the tetraalkylammonium compound, in a molar ratio of tetraalkylammonium compound/$SiO_2$ of from 0.05:1 to 0.15:1.

6. An amine-free borosilicate zeolite, which is prepared according to claim 1 and is additionally subjected to a heat treatment at from 350° C. to 600° C.

7. A process as claimed in claim 1, further comprising subjecting the borosilicate crystals to a heat treatment at from 350° C. and wherein the resulting crystals have an average particle size of from 3 to 120 μm with a narrower particle size distribution.

8. A borosilicate obtained by the process in claim 7, which contains the following diffraction lines in an X-ray diffraction pattern measured using Cu-K alpha radiation:

| Interplanar spacing (Ångström) | Rel. intensity $I/I^0 * 100$ |
| --- | --- |
| 11.0–11.2 | 50–85 |
| 9.96–9.98 | 55–100 |
| 3.81–3.83 | 70–100 |
| 3.72–3.74 | 10–15 |
| 3.70 | 10–30 |
| 3.62 | 5–25 |
| 1.99 | 5–10 |
| 1.98 | 5–10. |

9. A process as claimed in claim 1, further comprising subjecting the borosilicate crystals to a heat treatment at from 350° C. to 600° C. and wherein the resulting crystals have an average particle size of from 5 to 80 μm with a narrower particle size distribution.

* * * * *